Feb. 17, 1925.
C. L. NORTON
1,526,364
APPARATUS USEFUL IN MAKING PLASTIC SHAPES
Filed May 5, 1922    6 Sheets-Sheet 1
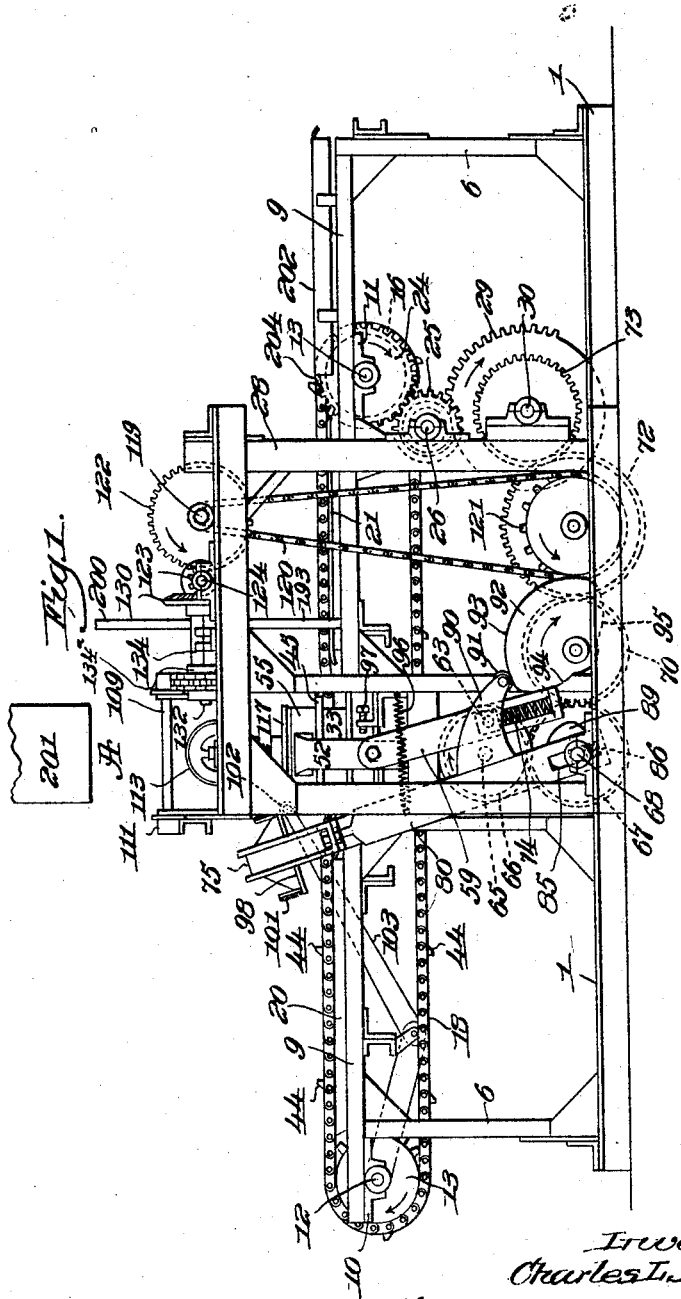

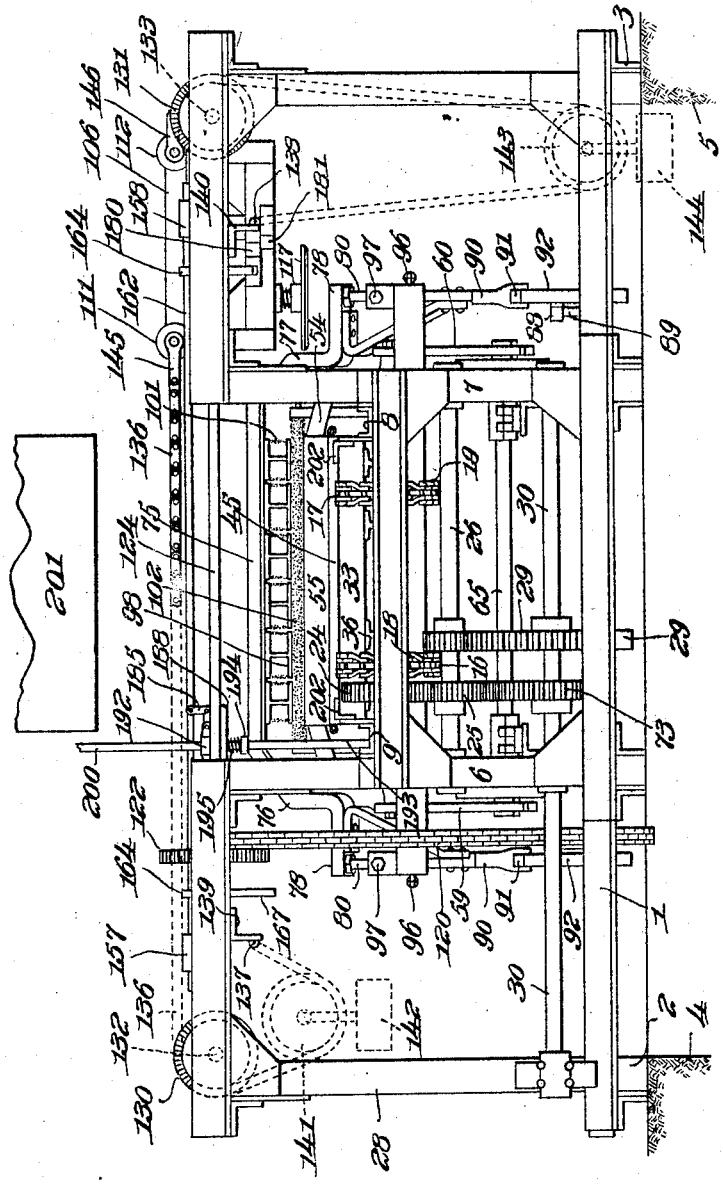

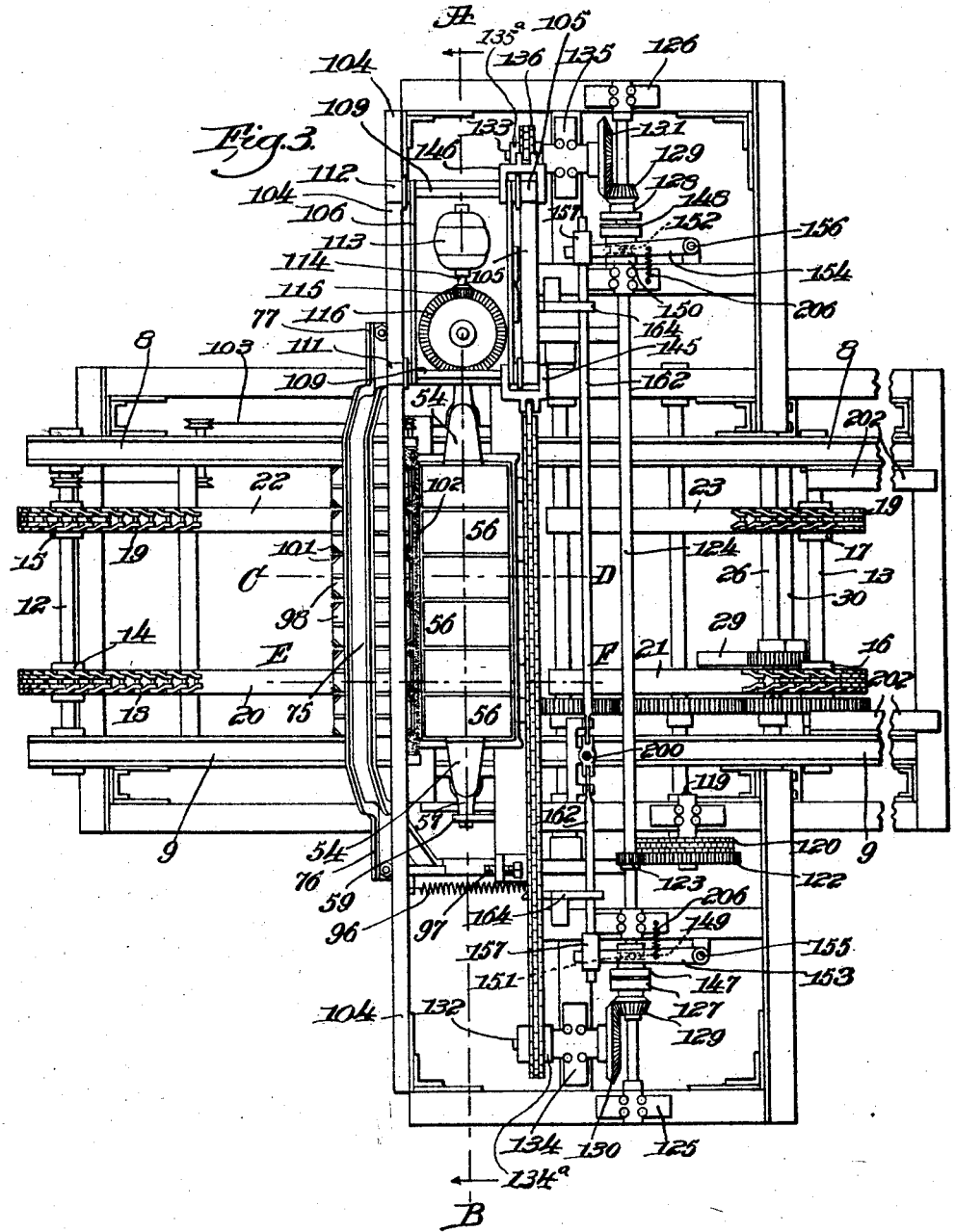

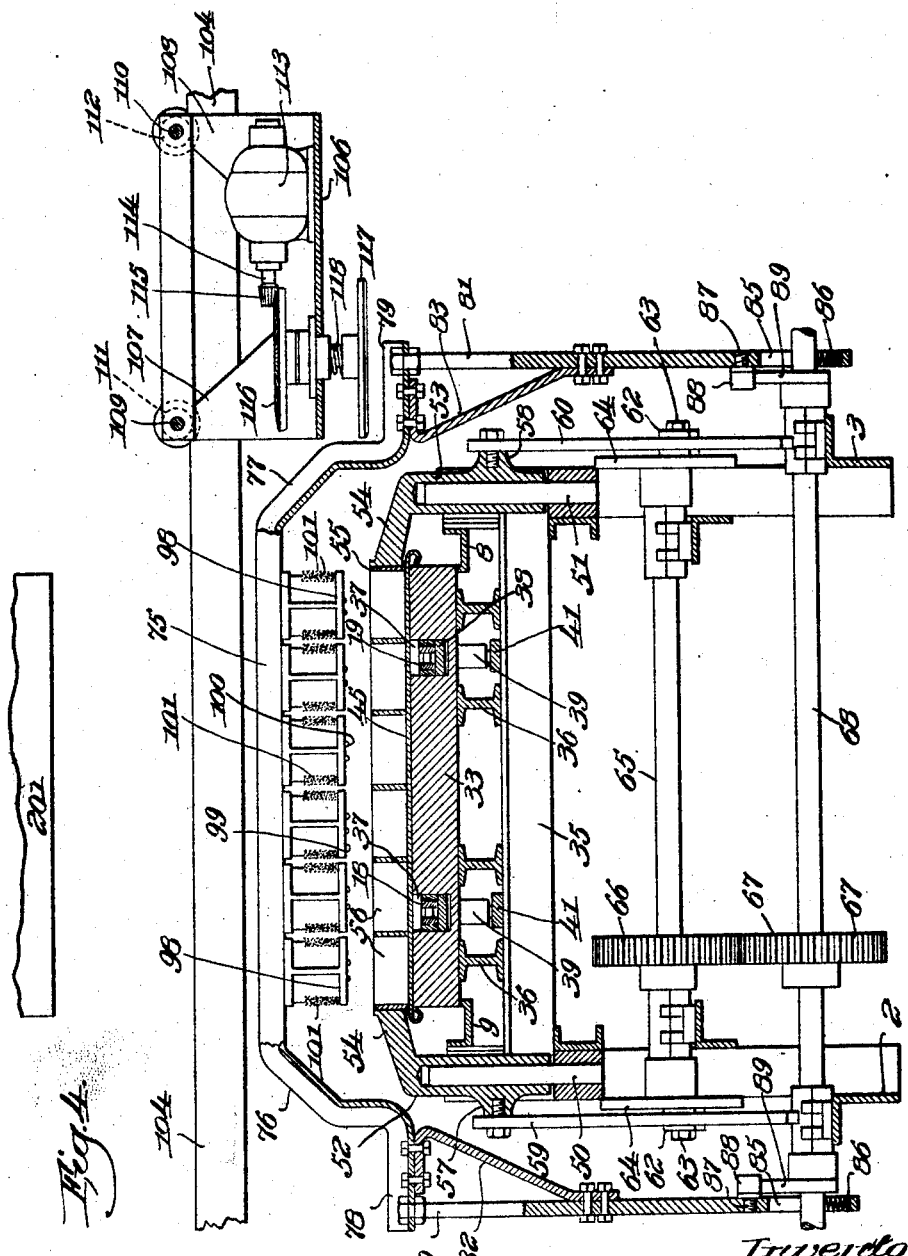

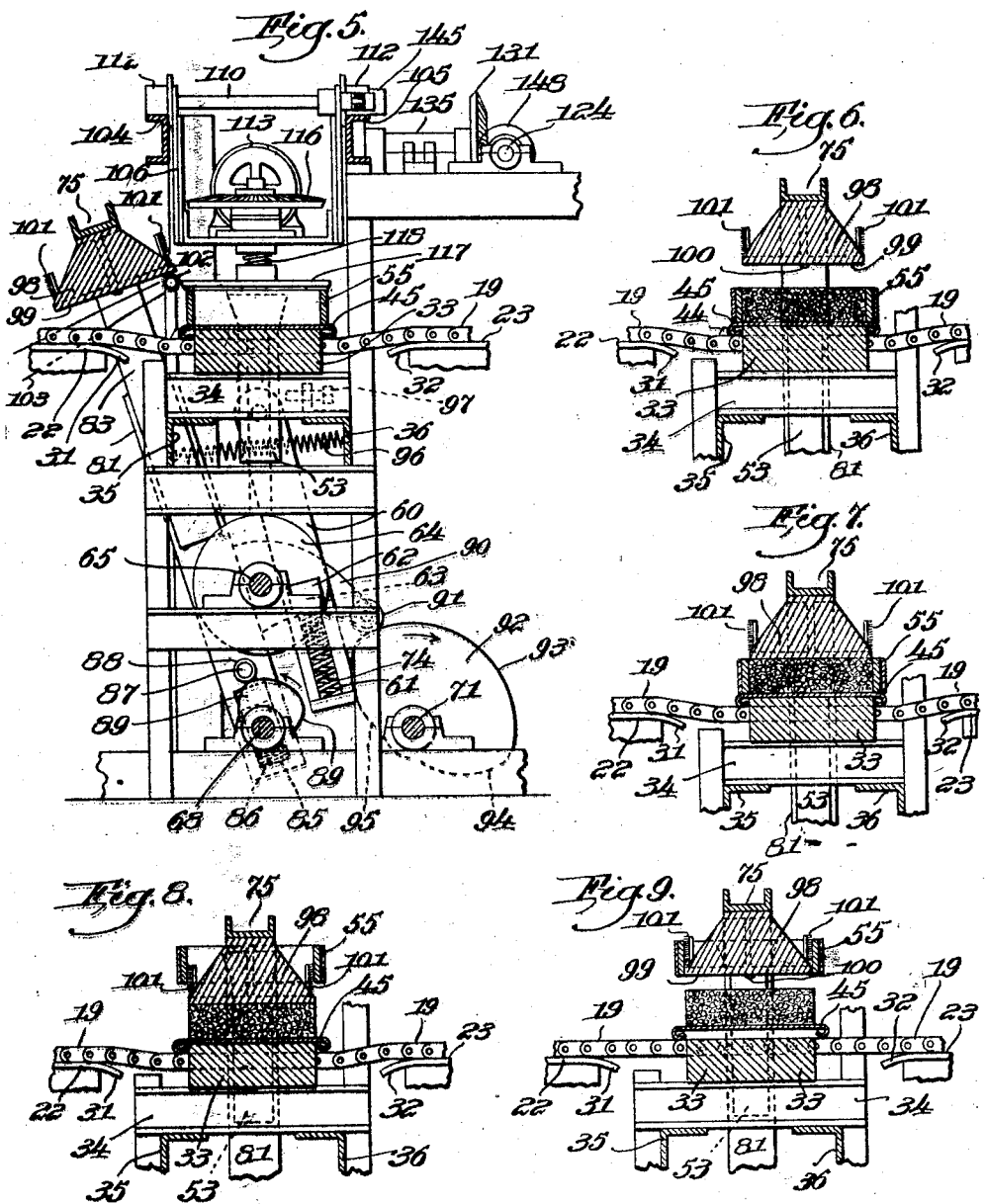

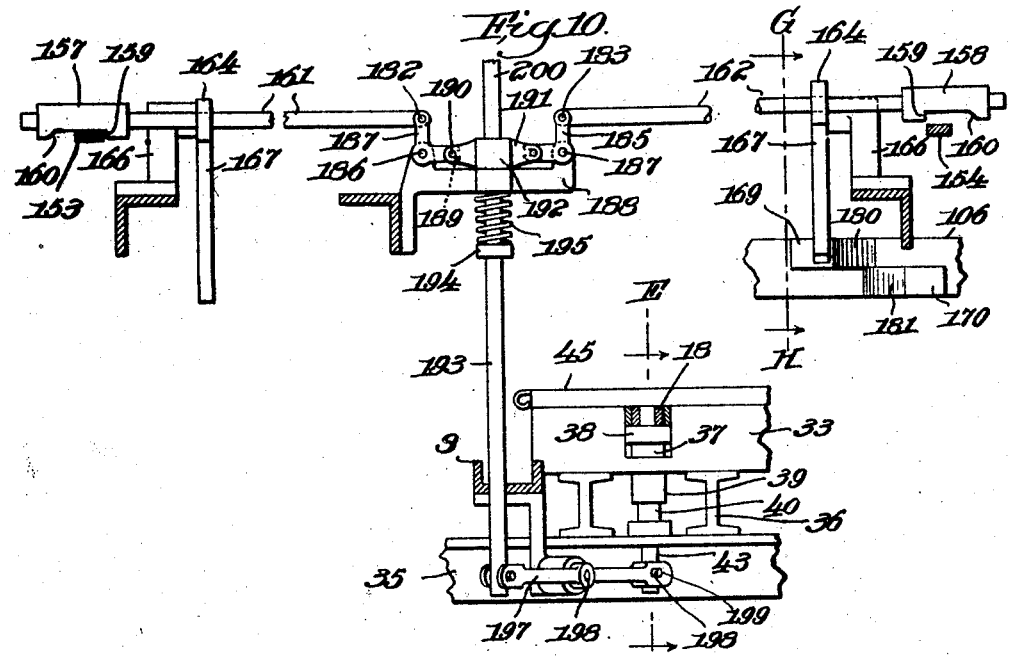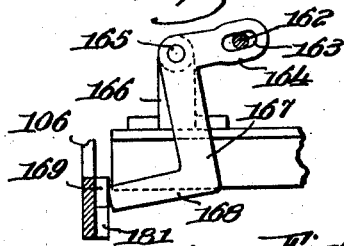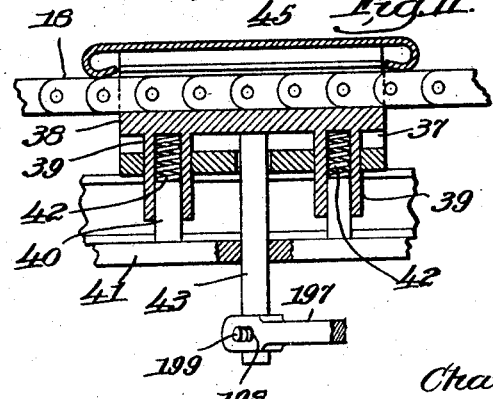

Patented Feb. 17, 1925.

1,526,364

UNITED STATES PATENT OFFICE.

CHARLES L. NORTON, OF BOSTON, MASSACHUSETTS, ASSIGNOR TO REFRACTORIES MACHINERY MANUFACTURING COMPANY, OF PITTSBURGH, PENNSYLVANIA, A CORPORATION OF PENNSYLVANIA.

APPARATUS USEFUL IN MAKING PLASTIC SHAPES.

Application filed May 5, 1922. Serial No. 558,686.

*To all whom it may concern:*

Be it known that I, CHARLES L. NORTON, citizen of the United States of America, and resident of Boston, in the county of Suffolk and State of Massachusetts, have invented new and useful Improvements in Apparatus Useful in Making Plastic Shapes, of which the following is a specification.

This invention concerns the manufacture of plastic shapes and relates more particularly to apparatus useful in the making of such shapes from materials having the general physical characteristics of those commonly used in the manufacture of refractory, silica brick.

As clearly set forth in my prior Patent No. 1,332,676, dated March 2, 1920, No. 1,332,677, dated March 2, 1920, No. 1,434,662, November 7, 1922, and No. 1,441,367, January 9, 1923, the commercial production of refractory, silica brick or shapes is attended with the greatest difficulty, although considered from a purely theoretical standpoint it might not appear that the various phases of manufacture would differ substantially from those common to the making of plastic shapes from the usual ceramic materials. The material employed, however, in making such refractory shapes differs essentially in its physical characteristics from clays such as are usually encountered in brick making or related ceramic arts. For example, the materials used in making silica brick consist of ground ganister rock with the addition of barely sufficient clay and water to enable the mass to retain its shape after moulding. The ground ganister is granular, the individual grains being exceedingly hard and of polygonal contour, thus presenting many salient angles, and such grains tend to interlock with adjacent grains to such an extent that no available degree of direct pressure is sufficient to force a mass of the material into a mould so as completely to fill the corners and angles of the latter.

Moreover by reason of the non-uniform character of the material, and the relatively large size of many of its particles, any shaping operation involving cutting or slicing of the mass results in tearing away portions of the shape during the process of its preparation or the scoring of the surface thereof to such an extent to make it worthless. Even after a shape has been moulded from this material it must be handled with the greatest care, as it is of such a friable character that the least shock, jar or pressure will cause it to bulge or bag out so as to make it utterly worthless. The usual modes of moulding plastic materials involving pressure, extrusion, or cutting are thus precluded and an entirely different method of procedure is necessary.

Prior to the invention of the process and apparatus disclosed in my aforementioned patents the only known and practical mode of moulding plastic shapes from the above described material, or material having generally similar characteristics, was by a purely manual operation which at best was attended with uncertainty and lack of uniformity and regularity of product. In accordance with such method the workman would grasp a mass of the material in his hands, and standing over the open top of the mould would hurl the mass into the latter. After the filling of the mould the material protruding from the top of the mould was "slicked off", a pallet or cover plate was placed upon the mould, and the mould was then inverted and lifted, thus leaving the moulded shape resting upon the pallet. The workman would then very carefully lift the pallet and convey it with the moulded shape thereon to the drying racks or baking oven, the moulded shape being of too friable a nature to permit of its being handled except by means of the pallet.

The moulding of the shape in inverted position was believed necessary for two reasons: First because the results of many experiments and tests seemed to indicate that if the pallet upon which the shape is afterward baked were used as the bottom element of the mould during the moulding operation, the extremely intimate contact of the moulded material with the surface of the metal pallet, occasioned by the unusual method of moulding employed, was such that after the drying of the moulded shape upon the pallet, the shape could not be separated from the pallet, and second, because it is commonly desired to impress or stamp certain indicia upon the moulded shape during the process of making the same. The provision of such indicia was usually accomplished by providing the mould bottom with raised characters of desired form so that each shape, as moulded, was impressed therewith, but even were it possible to mould the brick upon the pallet, it would manifestly be impracticable to furnish each pallet with an individual marking device.

For the above reasons it was deemed necessary, in devising the mechanical process and apparatus for moulding plastic shapes as disclosed in the aforesaid patents, to adhere to that practice which comprised filling the mould, placing a pallet thereon, and then inverting the mould to deposit the shape upon the pallet for drying. Thus both process and apparatus were complicated to a certain degree, and although such process and apparatus are eminently suitable for the intended purpose and fill a valuable place in the art from a practical and commercial standpoint, the expense of installation of the necessary apparatus is great, and careful supervision must constantly be exercised to maintain such apparatus in proper working condition. The present invention therefore has for its principal object the provision of a simplified apparatus useful in the manufacture of moulded shapes from materials having the general characteristics of those referred to, and in particular to provide an apparatus whereby such shapes may successfully be moulded upon the pallets upon which they are afterward dried or baked, and if desired provided with the proper indicia during the moulding process, such apparatus being capable of performing the desired operation in an expeditious manner and upon a practicable commercial scale, while at the same time avoiding unnecessary complication of parts with attendant expense in installation and up-keep.

In the accompanying drawings an arrangement of parts is shown which is eminently suitable for carrying the above objects into effect, such arrangement well exemplifying the numerous mechanisms which doubtless could be devised for producing the functional relationships and resulting utilities which characterize the invention herein disclosed. In such drawings, Fig. 1 is a side elevation of a machine for moulding plastic shapes, constructed in accordance with the present invention, certain parts being broken away for purposes of illustration, and the mechanism being indicated as occupying the position which it assumes at the beginning of each successive operation;

Fig. 2 is a front elevation of the device shown in Fig. 1, viewed from the right-hand side of the latter figure;

Fig. 3 is a plan view of the device, certain parts being broken away, and the means for supplying the plastic material to the moulding device being omitted;

Fig. 4 is a transverse cross section through the machine on a line such as A—B of Fig. 3, portions of the structure being broken away, this view being to somewhat larger scale than the preceding figures;

Fig. 5 is a fragmentary, vertical cross section to large scale on a line such as C—D of Fig. 3;

Figs. 6, 7, 8 and 9 are fragmentary, vertical sectional details of the central portion of the structure shown in Fig. 5, illustrating various steps in the operation;

Fig. 10 is a diagrammatic and fragmentary front elevation, certain parts being in section, showing the means for controlling the movement of the slicker device;

Fig. 11 is a fragmentary, vertical section to large scale on lines such as E—F of Figs. 3 and 10; and Fig. 12 is a fragmentary sectional view on the line G—H of Fig. 10, illustrating one of the controlling elements of the slicker-operating mechanism.

The machine frame comprises a base 1 having the side members 2, 3 which rest upon suitable supports 4, 5 such for example as the edges of a pit over which the machine is positioned. Upstanding from this base are a series of uprights such as 6, 7, upon which is supported a horizontal frame comprising the side bars 8, 9. Depending from the side bars 8, 9 are brackets such as 10, 11 providing journals for horizontal shafts 12, 13 respectively, the shaft 12 being located at the extreme rear end of the machine and the shaft 13 adjacent to the forward end thereof. Upon each of these shafts are secured sprocket wheels 14, 15, 16, 17 respectively. Over the sprocket wheels 14, 16 an endless chain 18 is trained, while over the sprocket wheels 15, 17 is trained a similar chain 19. The upper runs of these chains rest upon and are guided by pairs of rails 20, 21, 22, 23, respectively, the rails of each pair being spaced apart at their adjacent ends for a purpose which will hereinafter be described.

To the shaft 13 is secured a gear wheel 24 meshing with a pinion mounted upon a shaft 26 journaled in a bracket 27 which is mounted upon the upright 28. Fixed to shaft 26 is a mutilated pinion 25 which in turn meshes with a mutilated gear 29 fixed to the drive shaft 30 suitably journaled in upright members of the frame, and which may be driven in any suitable manner. Referring to Fig. 5 it will be noted that the adjacent ends of the chain-supporting rails 22, 23 are bent downwardly somewhat, as shown at 31, 32. In the space between such ends of the rails an anvil block 33 is supported upon a frame 24 carried by brackets 35, 36 secured to upright members of the main frame. This anvil block extends transversely across the upper runs of the chains 18, 19, and its upper surface lies substantially in the plane of the upper edges of such chains.

To permit the passage of the chain transversely of the anvil block, the latter is provided with slots of a width and depth sufficient properly to receive and guide the chains, one of such slots being indicated at 37 in Fig. 10. Within each of the slots and loosely fitting the same is a horizontal plate 38 which serves to support the chain at that portion thereof which passes through the slot, each of such plates being provided with a pair of depending sleeves 39. These sleeves pass through suitable openings in the bottom wall of the slot and slidably engage fixed posts 40 upstanding from bracket member 41 carried by the respective members 35 hereinbefore described. Interposed between the upper ends of the posts and the inner ends of the sleeves are coil springs such as 42. These springs serve normally to sustain the plate 38 within the slot at such a level that the portions of the chains which pass through the guide slot are supported in substantial horizontal alignment with those portions of the chain which rest upon the guide rails 20, 21.

Projecting downwardly from the lower surface of one of the plates 38 is a rod or bar 43, such bar passing downwardly through an opening in the bottom of the anvil plate and serving for a purpose hereinafter to be more fully described. Each of the chains 18, 19 is provided with suitable lugs or teeth 44, such teeth being provided at spaced points in the lengths of the chains.

The chains, as thus described, serve for transferring pallet plates from the rear end of the machine to the forward end thereof, such a pallet being indicated at 45 in Fig. 11. These pallets are preferably formed from sheet material and have rolled flanges at their edges as fully disclosed in my Patent No. 1,434,662, dated November 7, 1922. The lugs or teeth 44 upon the chains engage the pallets, and positively move them forward with the chains, the chains being moved intermittently by means of the drive mechanism including the mutilated gear 29 previously referred to, each intermittent movement being sufficient to carry a pallet plate 45 through a horizontal distance slightly greater than its width.

The machine frame is provided with parallel upstanding guide posts or rods 50, 51 which are engaged by sleeve members 52, 53, respectively, secured to or forming integral parts of a mould-supporting frame 54. This mould-supporting frame is of elongate rectangular form and provided with an opening for the reception of a mould-box 55. This mould-box is open at top and bottom, and comprises a series of mould compartments 56. While this mould-box is herein illustrated as independent of the supporting frame 54 and mounted therein, it is to be understood that it might be integral therewith, if desired. The position of the guide posts 50 and 51 is such that the mould 55 is located directly above the anvil 33, the latter being substantially co-extensive with the mould.

Projecting outwardly from the sleeve members 52, 53 are brackets 57, 58, respectively, to which are pivotally secured the upper ends of connecting rods 59, 60. These connecting rods, as indicated in Fig. 5, are provided adjacent their lower ends with elongate slots such as 61. Slidable in each of said slots is a block 62 having a journal opening for a crank arm 63, such crank arm being carried upon a disc such as 64 fixed to the end of a shaft 65. This shaft is provided with a gear 66 meshing with a gear 67 upon a shaft 68, the latter gear also meshing with a gear 70 upon the shaft 71. The latter gear is driven by engagement with a gear 72 meshing with a gear 73 fixed upon the drive shaft 30. The relation of the several gears of the train of gears, just described, is such that for each revolution of the drive shaft 30 the crank 63 will be turned through one complete revolution. Intermediate the lower end of the slot 61 and the block 63 is a coiled compression spring 74, such spring normally urging the block 62 upwardly in the slot that upon rotation of the shaft 65 the mould-supporting frame 54 with the mold-box will be vertically reciprocated toward and from the anvil 33.

Extending above the mould-supporting frame is a push-plate supporting device 75, such devices comprising a substantially horizontal upper member having depending arms 76, 77 at its opposite extremities. These arms at their lower ends are bent outwardly at right angles providing the members 78, 79, respectively, and to such horizontal members are secured the upper ends of supporting bars 80, 81. For rendering such parts more rigid and stiff, brackets 82, 83 are bolted to the parts 78, 79 and the members 80, 81 respectively. The members 80, 81 extend downwardly upon opposite sides of the connecting rods 59, 60, hereinbefore referred to, and at their lower ends are provided with elongate slots 85. These slots take over the end portions of the shaft 68 previously referred to, such shaft serving as pivotal means whereby the movement of the parts 80, 81 and the push-plate support carried thereby is determined.

Preferably, as indicated in Fig. 5, a coil compression spring 86 is arranged in the lower part of each of the slots 85, such spring bearing against the under surface of the shaft 68 and normally urging the members 80, 81 downwardly. Secured in each of the members 80, 81 at points immediately above the slots therein are pins 87 serving as pivotal supports for anti-friction roll 88. These rolls engage cams 89 respectively mounted upon the shaft 68 at points in the vertical planes of the respective rolls 88. Projecting forwardly from each of the members 80, 81 respectively, is a bracket arm 90, such bracket arm being provided at its forward extremity with an anti-friction roll 91. The rolls 91 engage cams 92 fixed upon the opposite ends of the shaft 71, previously referred to. These cams each comprise a substantially concentric portion 93 followed by the drop 94 and the riser 95.

In the operation of the parts just described the cams 89, acting upon the rollers 88, serve to lift the members 80, 81 with the push-plate support 75, thereby compressing springs 86, and that upon rotation of the cams 89 the members 80, 81 with the plate carrier are permitted to drop by reason of the weight of the parts assisted by the springs 86. The cam 92 acting upon the rolls 91 and arms 90 serves to swing the members 80, 81 rearwardly about the shaft 68 as an axis, such movement being in opposition to springs 96 secured to the respective members 80, 81, and to adjacent points upon the frame, such springs normally tend to move the members 80, 81 with the push-plate support forwardly when permitted to do so by the cam 92. The upward movement of the members 80, 81 is limited by the stop screws 97 carried upon suitable brackets secured to the frame.

Upon the push-plate support 75 are secured a series of push-plates 98, herein shown as blocks corresponding to the individual mould cavities 56 and provided with substantially flat lower surfaces 99 shaped to conform to the interior of the mould cavities and adapted to fit loosely therein. Upon the flat lower surface 99 of each push plate suitable raised characters indicated at 100 may be secured whereby to impress the moulded shapes with the indicia desired. These raised characters may be carried by removable plates, if desired, secured to the under faces of the push-plates, and interchangeable with other plates having other indicia thereupon.

Preferably a brush 101 is secured to each corner of each push-plate adjacent to the lower face thereof, such brushes serving to clean the corners of the mould cavities as the push-plates move relatively thereto. A rotatable brush 102 is also provided, such brush being mounted in suitable brackets carried by the frame and being slowly rotated by means of a belt 103 actuated by a pulley upon one of the driven shafts of the machine. This rotating brush is so positioned that as the push plates are oscillated from front to rear they pass in contact with the brush and are cleaned thereby.

At the upper part of the frame a pair of spaced rails 104, 105 is provided, such rails extending transversely of the machine and substantially parallel to the front and rear edges respectively of the anvil plate 33. Supported by these rails is a slicker supporting frame 106, which is provided with upstanding flanges 107, 108, at either side. These flange members are provided with journal openings for a pair of shafts 109, 110, respectively. Upon the ends of these shafts are secured rollers 111, 112 which rest upon the guide rails 104, 105, thereby permitting free movement of the slicker supporting frame transversely from one side of the machine to the other.

Mounted upon the frame 106 is a motor 113 having a shaft 114 provided with a pinion 115 engaging a gear 116 secured to a vertical shaft journaled in the frame 106. Upon the lower end of this shaft is secured a rotatable slicker disc 117, such disc being keyed to the shaft. Slight vertical movement of the disc is permitted, such movement being in opposition to a coil spring 118 surrounding the shaft above the disc. In the normal position of the parts the lower face of the disc 117 lies in the plane of the upper surface of the mould-box when the latter is in operative or charge-receiving position. The slight freedom of vertical movement permitted the disc is for the purpose of preventing breakage of the parts if for any reason the mould should fail to descend to the desired degree prior to the movement of the slicker plate across the same.

In the upper portion of the machine frame and in front of the guide rails for the slicker frame is mounted a shaft 119 upon which is secured a sprocket wheel driven by a chain 120 trained about a sprocket wheel 121 fixed to the shaft upon which the gear 71 is mounted. Secured to the shaft 119 is a gear 122 meshing with a pinion 123 upon a shaft 124 which extends transversely across the upper part of the frame, being journaled at its extremities in brackets 125, 126, respectively. Loosely mounted upon said shaft adjacent to either end thereof is a clutch element 127, 128, respectively, such clutch elements each being provided with a bevelled gear 129 meshing with bevelled gears 130, 131, respectively, carried upon short shafts 132, 133, journalled in brackets 134, 135, respectively, supported upon the machine frame.

The shafts 132, 133 are provided with sprocket wheels 134$^a$, 135$^a$, respectively, over which is trained a sprocket chain 136. The opposite ends of this chain are secured at 137, 138, respectively, to brackets 139, 140 fast to the machine frame. Between the point 137 and the sprocket wheel 134ª a pulley 141 is supported upon the chain, such pulley being provided with a weight 142. Between the point 138 and the sprocket wheel 135ª a second pulley 143 is supported upon the chain, such pulley being provided with a weight 144. The weighted pulleys as thus arranged serve to keep the chain 136 taut and to maintain it in proper engagement with the supporting sprocket wheels, thus making it unnecessary to continue the chain across the machine between the points 137 and 138. The upper run of the chain is secured, as indicated at 145, 146 to the opposite ends of the slicker supporting frame.

Splined to the shaft 124 are clutch elements 147, 148, respectively, such clutch elements cooperating with the clutch elements 127, 128 previously referred to. The clutch elements 147, 148 respectively are provided with collars 149, 150, and into the grooves of such collars project pins 151, 152, carried by levers 153, 154 pivoted at the points 155, 156 to brackets suitably secured to the frame. As thus arranged horizontal swinging movement of the levers serves to cause engagement or disengagement of the cooperable clutch elements whereby movement of rotation may be transmitted from the shaft 124 to the sprocket wheels 134ª, 135ª, thereby causing the slicker-supporting frame to move transversely across the machine.

Referring to Fig. 10, the levers 153, 154 are indicated in cross section. Cooperable with said levers are actuating latches 157, 158, respectively, such latches comprising the shoulders 159 and the inclined faces 160, the shoulders being adapted to engage the lever arms for holding them in adjusted position and also for moving them to adjusted position. The latch elements 157, 158 are secured to a pair of bars 161, 162, respectively, such bars at points adjacent the latch members passing through slots such as 163 (see Fig. 12) in the sort arms 164 of bell crank levers, such levers being pivoted as at the points 165 upon brackets 166 mounted upon the frame. The longer arms 167 of these bell cranks are bent to provide the rearwardly directed members 168. The ends of the members 168 are so disposed as to lie in the paths of movement of a pair of cams 169, 170, respectively, carried by the slicker-supporting frame, such cams being provided with inclined surfaces 180, 181.

The adjacent ends of the bars 161, 162 are pivotally secured at the points 182, 183 to the upwardly extending arms 184, 185 of bell crank levers pivoted at the points 186, 187, respectively. These bell crank levers are mounted upon a bracket 188 secured to the frame and having horizontally extending arms which are slotted, as indicated at 189, at their inner extremities. The slits in these arms engage over pins 190 carried by brackets 191 projecting in opposite directions from a collar 192 secured to a rod 193 which passes through an opening in the bracket 188. Below the bracket 188 the rod 193 is provided with a fixed collar 194 and interposed between such collar and the bracket is a coiled spring 195 surrounding the rod 193 and normally tending to depress the latter until the collar 192 comes into contact with the upper surface of the bracket 188.

The rod 193 extends downwardly and through an opening in frame member 9 at a point adjacent to the anvil 33. The lower end of this rod is pivotally secured to an arm 197 of a lever pivoted at the point 198 to the frame, such lever being provided at its opposite extremity with an elongate slot 198 through which passes a pin 199 secured in the lower end of the rod 43 previously referred to. The upper end 200 of the rod 193 is extended upwardly to a suitable device indicated diagrammatically, at 201 whereby plastic material is supplied to the mould-box. The device 201 may represent the lower end of a chute such as is illustrated in my prior Patent No. 1,332,677, dated March 2, 1920, the rod 200 being then arranged to actuate the gate opening elements of the dumping mechanism employed in connection therewith. It is contemplated, however, that in place of the chute shown in such prior patent a movable hopper may be employed, of the type disclosed for example in my Patent No. 1,441,367, dated January 9, 1923, in which case the rod 200 would actuate the trigger release whereby such removable hopper is permitted to drop for projecting its charge into the mould-box.

At the forward part of the machine a pair of rails 202, 203 are provided having downwardly directed rear ends as indicated at 204 (Fig. 1). The upper surfaces of these rails lie substantially in the plane of the upper edges of the pallet-carrying chains 20, 22, and the ends 204 of the rails extend downwardly at the outer sides of the respective chains to guide pallets carried by the chains upwardly and onto the rails. As successive pallets ride up onto the rails 202, 203 they are pushed forwardly by subsequently arriving pallets and are removed from the rails by the workman for transfer to the drying racks.

The operation of the machine is generally as follows, it being assumed that the slicker frame is at the right hand side of the machine, as shown in Fig. 4, for example, that the mould box is in its extreme up position, and that the pallet-carrying chain occupies the position indicated in Fig. 11. It is further assumed that the workman standing at the rear of the machine has placed pallets upon the chains 18, 19 and that one of such pallets 45, as indicated in Fig. 11 has arrived at a point directly above the anvil 33. The intermittent drive of the pallet chains is so timed that as a pallet arrives at the position of Fig. 11, it comes to rest temporarily. At this instant the crank pin 63 acting upon the connecting rods 59, 60 starts to depress the mould-box, this movement continuing until the mould-box rests upon the pallet positioned as previously described.

The continued rotation of the crank pin 63 now forces the mould-box downwardly against the pallet 45 with sufficient pressure to depress the chains 18 and 19 at that portion thereof which passes through the slots in the anvil plate, this movement being permitted by the resilient support furnished the chains by the plates 38. The downward movement of the mould-box and pallet continues until the pallet rests upon the upper surface of the anvil plate, and as the crank 63 continues to rotate, the spring 74 is compressed while the pallet is held very firmly against the anvil plate and in a substantially horizontal plane. As the chain supporting plate 38 is depressed during this operation, the rod 43 moves downwardly, thereby lifting the rod 193, Fig. 10, thus swinging the bell crank levers 184, 185, about their pivots so as to move their rods 161, 162 in opposite directions outwardly.

An indicated in Fig. 10 the movement of the rod 193 upwardly causes its upper extension 200 to release the trigger or other actuating devices whereby a charge of plastic material is dropped into the mould-box completely filling the same, such charge, however, for proper operation being in excess of that necessary to fill the mould-box. The movement of the rods 161, 162 outwardly in opposite directions takes place substantially simultaneously with the release of the charge. The shoulder 159 of the latch member 157 being in position to engage the lever 153, while the shoulder 159 of latch 158 is held out of engagement with the lever 154, movement of the rod 161 swings the lever 153 whereby the clutch element 147 is caused to cooperate with its complemental clutch element 127.

The rotation of the shaft 124 is such that upon such engagement of the clutch elements the sprocket 134 is driven, thereby causing the slicker carriage to traverse from one side of the machine to the other. During such traversing movement the motor 113 causes the slicker disc 117 to rotate thereby slicking off the surplus material from the top of the mould and at the same time compressing and compacting the material therein. As the slicker carriage reaches the opposite side of the machine frame, the cam incline 181 engages the left hand lever member 168, thereby raising the arm 164 of such lever member and lifting the rod 161 whereby the shoulder 159 is disengaged from the lever 153. The lever member 168 rides up onto and rests upon the surface 170 of the cam and is held from further movement thereby. At the same time, the lever 153 is caused to swing in a clockwise direction by means of the spring 206, the tendency of which is normally to move the lever in this direction. The clutch elements 147 and 127 are thus disengaged and the slicker frame comes to rest.

Immediately after the passage of the slicker across the mould box the rotation of cam 92 permits the roll 91 to drop along the face 94 thereof, thereby permitting the spring 96 to swing the push-plate support forwardly until it is stopped by the member 97. When in this position the several push plates stand immediately above the corresponding mould cavities of the mould-box, and when so positioned the movement of the cam 89 permits the push-plate carrier with the push plates to drop, the movement being assisted by the spring 86. The push plates, in dropping, assume the position shown in Fig. 7 where they compress the material within the moulds and at the same time impress thereon the desired indicia.

Immediately after this operation the mould-box begins to rise, the movement being permitted by the rotation of crank pin 63 assisted by the spring 74. The upward movement of the mould-box is such as to bring the parts into the position shown in Fig. 8, where the push plates still remain in contact with the moulded shapes and the mould-box has been retracted from the latter leaving the shapes resting upon the pallet plate. During this upward movement of the mould-box the brushes 101 carried by the push plates sweep out the corners of the mould-box cavities thereby removing any material which may stick thereto as the mould-box is retracted.

The cams 89 now act upon the rolls 88, to move the push plates vertically upwardly into the position shown in Fig. 9. This relieves the pallet of any pressure other than that of the moulded shape resting thereon, and the pallet-carrying chains may now be moved another step thereby carrying the pallet with its moulded shape from beneath the mould-box. The mould-box now descends to engage a fresh pallet and the cam rise 95 of the cam 92 now acts upon the cam roll 91, to swing the push-plate support rearwardly against the action of the spring 96, thus restoring the push-plates to the position indicated in Figs. 1 and 5. The cam roll 91 now rides up on the concentric surface 93 of the cam 92 whereby the push-plate carrier is held in such rearward position during the next downward movement of the mould, the filling of the same and the actuation of the slicker.

As the mould and push plate are lifted, as above described, and the pallet-carrying chains are relieved of the weight thereof, the supporting plates 38 rise under the action of the spring 42 thereby permitting the spring 195 to depress the rod 193, Fig. 10. This movement of the rod 193 and its collar 192 serves to draw the rods 161, 162 inwardly toward each other. During the movement of the slicker frame from the position shown in Fig. 4 to the opposite side of the machine, the cam 169 is also removed from behind the member 168 of the lever 167 at that side of the machine, thereby permitting the end of the rod 162 to drop. The inward movement of the rods 161 and 162, as just described, thus brings the shoulders 159 into position to engage the edges of the respective levers 153, 154, but as the latch member 157 at the left hand side of the machine is at this time held in elevated position by the lever 167, its shoulder 159 cannot engage lever 153.

The parts are now so disposed that upon upward actuation of the rod 193 upon the depression of the mould in the next subsequent operation, the lever 154 will be actuated, thereby causing engagement of the clutch elements 148 and 128 whereby the slicker-carrying chain will be moved in the opposite direction to restore the slicker to the position shown in Fig. 4. Thus the slicker travels from one side of the machine to the other, its successive travels alternating with successive actuations of the mould.

As the pallet-carrying chains are moved step by step, the loaded pallets move toward the front of the machine and are simultaneously pushed up onto the rails 202, 203 from whence they are removed by the workman to the drying racks. Prior to placing the pallets upon the chains they are coated with some suitable material, such as to prevent sticking of the moulded shape thereto. A suitable material for this purpose is crude petroleum or some product thereof, although in fact almost any material of an oleaginous character may be utilized for this purpose. It is found in practice that the pallet need not be coated each time it is used but that a single coating will last for several operations.

By employing the process hereinbefore described it is possible to mould plastic shapes from refractory material, such as ground ganister without inverting the shapes during the moulding process and at the same time permitting the placing of suitable indicia upon the upper surfaces of such shapes. When the pallet plates are coated with the material above referred to, no difficulty whatever is experienced in removing the shape therefrom after drying, even though the material is projected into the mould and against the pallet plate under the highest velocity available. The machine operates rapidly and with but little attention on the part of the workman, and is so designed that its parts are capable of withstanding the rough usage to which they are subjected in carrying the process into effect.

While as herein disclosed a specific arrangement of parts has been employed for carrying out the successive steps of the process it is evident that other and equivalent arrangements might well be substituted therefore, and that while the operation has been disclosed as comprising a series of steps having a definite sequence, certain of the steps might well be interposed at other intervals in the process than those herein designated, or might even be omitted, if desired, without departing from the spirit of the invention, and without sacrificing its general advantages.

I claim:

1. A machine of the class described comprising a conveyor for moving independent unconnected pallets, a movable mold box, means for pressing the mold box into engagement with successive pallets, and means whereby plastic material may forcibly be projected into the mold box while engaging a pallet plate, and means for positively ejecting the molded shape from the mold box.

2. A machine for molding plastic shapes comprising conveyor means for moving independent unconnected pallets, a fixed pallet support upon which successive pallets are directly deposited by the conveyor, a movable mold box, means for forcibly pressing the mold box against a pallet resting upon the support, means for filling the mold box while in engagement with the pallet plate, and means for ejecting the molded shape from the mold box.

3. A machine for molding plastic shapes having means for conforming a sheet metal pallet plate to a true horizontal plane comprising a fixed anvil having a substantially flat upper face for directly supporting a pallet plate and a vertically movable mold box for clamping the pallet plate against said face, means whereby plastic material may be supplied to the mold box, means for successively moving independent pallet plates to a position above the anvil, and means for positively ejecting the molded shape from the mold box.

4. A machine for moulding plastic shapes comprising a fixed pallet supporting anvil, means for successively positioning independent pallets upon said anvil, and means for lowering a mould-box upon a pallet so positioned and for resiliently depressing said mould-box whereby firmly to press the pallet into contact with the anvil, and a push plate cooperable with the mold box to eject the molded shape therefrom.

5. A machine of the class described comprising a vertically movable mold box, a conveyor comprising a pair of spaced parallel chains provided with pallet-engaging lugs adapted directly to engage an empty pallet plate and to move it to operative position below the mold box to receive a molded shape therefrom and to convey the loaded pallet plate away from the mold box, means for filling the mold box, and a vertically movable push plate cooperable with the box to eject the molded shape therefrom.

6. A machine for making plastic shapes comprising an endless flexible unidirectionally moving conveyor for independent unconnected pallets, a fixed rigid anvil overlying the plane of the upper surface of the conveyor, a vertically movable mold box, means for moving the mold box to press a pallet carried by the conveyor into engagement with the anvil, and means for filling the mold box while in engagement with the pallet.

7. A machine for making plastic shapes comprising an endless flexible intermittently moving conveyor for moving independent unconnected pallets, a fixed anvil below the normal plane of travel of the pallets upon the conveyor, a mold box guided to move vertically toward and from the upper surface of the anvil, means for moving the mold box to press a pallet carried by the conveyor into contact with the anvil and means for filling the mold box while engaging the pallet.

8. A machine of the class described comprising a pallet supporting anvil, a pallet conveyor chain normally positioned to move a pallet with its lower face in a horizontal plane spaced from the upper surface of said anvil, and means whereby said chain is permitted to move downwardly whereby to permit a pallet supported thereby to rest directly upon said anvil.

9. A machine of the class described comprising a pallet supporting anvil having a slot therein, a horizontally disposed plate vertically slidable in said slot, and resilient means for supporting said plate.

10. A machine for moulding plastic shapes comprising a pallet supporting anvil having a transverse slot therein, a chain supporting plate within said slot, a pallet conveyor chain resting upon said plate, and resilient means normally urging said plate upwardly within said slot.

11. A moulding machine comprising an anvil having a transverse slot thereon, a pallet conveying chain traversing said slot, and resilient means normally supporting said chain whereby its upper surface lies substantially in the plane of said anvil.

12. A machine for moulding plastic shapes comprising an anvil block having parallel slots therein, an elongate horizontal plate vertically slidable within each of said slots, spring means urging each of said plates upwardly in its respective slot, and a pair of endless pallet conveyor chains having their upper runs respectively resting upon the respective plates, the parts being so constructed and arranged that the upper surfaces of such runs of the chains normally lie substantially in the plane of the upper surface of the anvil.

13. A machine for moulding plastic shapes comprising an anvil having a transverse slot in its upper face, a pair of fixed posts projecting upwardly from the bottom of said slot, a chain supporting plate fitting loosely in said slot, a pair of sleeve members projecting downwardly from said plate and engaging the respective posts, and compression springs within said sleeves and normally urging said plate upwardly.

14. A machine of the class described comprising a mould-box support, means for guiding said support for vertical movement, a rotatable crank, a connecting rod having a longitudinal slot therein, a block journaled upon the crank and slidable in said slot, a spring for urging said block toward one end of the slot, and means for transmitting movement from the connecting rod to said support.

15. A machine for forming plastic shapes comprising a vertically movable mould-box, a push plate positionable over said mould-box, resilient means tending to cause said push plate to descend into said mould-box, and means for positively raising the plate from the box.

16. A machine for making plastic shapes comprising a push plate, and a movable support therefor, said support being constructed and arranged to permit said plate to move both laterally and vertically, resilient means for moving said support laterally and downwardly, and positive means for restoring the support to normal position above and to one side of the mold box.

17. A machine of the class described comprising a push plate, a support therefor, a mold box, means for swinging said support about an axis below the mold box, and means to limit swinging of the support when the push plate has reached a position directly above the mold box.

18. A machine of the class described comprising a push plate, a movable support therefor, a mould-box, resilient means for moving said push plate to a position directly above the mould-box and cam means for moving said push plate laterally away from the mould-box.

19. A machine for making plastic shapes comprising a push plate, a movable support therefor, a mould-box, resilient means tending to move said push plate to a position directly above the mould-box, and stop means for limiting such movement.

20. A machine of the class described comprising a push plate, a movable support therefor, a spring for moving said support in one direction, adjustable stop means for limiting such motion, and a cam device for moving such support in the opposite direction.

21. A machine of the class described comprising a push plate, a support therefor comprising an arm pivotally supported adjacent to its extremity, a bracket outstanding from said arm, and a rotatable cam engageable with an element carried by said bracket whereby to swing said arm and thereby to move said push plate.

22. A machine for moulding plastic shapes comprising a push plate, a support therefor comprising a downwardly directed arm having an elongate slot adjacent to its lower end, a block slidable within said slot, and a pivot member journalled in said block.

23. A machine of the class described comprising a push plate, a downwardly directed arm for supporting the same, said arm having an elongate slot therein, a block slidably engaging said slot, a spring interposed between said block and one end of the slot, and a pivot member journaled in said block and constituting a support for said arm.

24. A machine of the class described comprising a mould box, a push plate cooperable therewith and normally positioned above and to one side of the box, a support for said push plate comprising an arm projecting downwardly from each end of the push plate and in spaced relation to the corresponding ends of the mould box, pivotal means for supporting said arms, and automatic means for moving the support to a position directly above the mold box and then down into the box.

25. A machine of the class described comprising a pallet support, a vertically movable mould-box, a laterally and vertically movable push plate, and automatic means for actuating said mould-box and push plate in timed relation.

26. A machine for moulding plastic shapes comprising a mould-box, a push plate cooperable therewith, means for moving said push plate laterally to a position directly above the mould-box, means permitting such push plate when so positioned to descend into the mould-box, and resilient means normally tending to cause such descent.

27. A machine of the class described comprising a mould-box, a push plate cooperable therewith, means for moving said push plate laterally to a position directly above the mould-box, and cam means normally operative to hold said push plate at a relatively high level but constructed and arranged to permit free gravitative descent of the push plate into the mould-box when properly positioned relatively thereto.

28. A machine of the class described comprising a vertically movable mould, a push plate cooperable therewith, means for imparting vertical movement to the mould, means for moving the push plate laterally whereby to register it vertically with the mould, means normally tending to cause the push plate to descend into the mould-box, and means for lifting the push plate from the mould-box and for restoring it to initial position.

29. A machine of the class described comprising a mould-box, a push plate cooperable therewith, means permanently positioned vertically above the mold box for delivering a charge of material into the latter, and means for holding said push plate in a position out of vertical registry with the mould during filling of the latter.

30. A machine of the class described comprising a mould-box, means permanently positioned vertically above the mould-box for delivering a charge of plastic material into the latter, a push plate cooperable with the mould-box, means normally tending to maintain said push plate in vertical registry with the mould-box and between the latter and the charge delivering means, and means for holding the push plate out of vertical registry with the mould-box during filling of the latter.

31. A machine of the class described comprising means for supporting a pallet plate, means for causing a mould-box to descend upon a pallet plate so supported, means permanently disposed directly above the mold-box for filling the latter with plastic material, a push plate cooperable with the mould-box, means permitting the push plate to descend upon the material in the mould-box, means to lift the mould-box to leave the moulded shape upon the pallet, and means for lifting the push plate subsequent to initiation of upward movement of the mould-box, the several operating means moving automatically in timed relation.

32. A machine of the class described comprising means for supporting a pallet plate, means for positioning a mould-box thereon, means for filling the mould-box with plastic material by dropping a charge in the form of a dense swarm of discrete particles from a height into the box, a push plate cooperable with said mould-box, said push plate having suitable characters thereon for impressing desired indicia in the upper surface of the moulded shape, and means for successively initiating upward movement of the mould-box and plate whereby to leave the moulded shape resting upon the pallet.

33. A machine of the class described comprising a mold box, means for moving the mold box in a vertical path toward and from filling position, means whereby plastic material may be delivered to said mold box, a horizontally movable slicker device for removing surplus material from the top of the mold, and automatic means for moving the slicker device.

34. A machine for making plastic shapes comprising a vertically movable mould-box, means for filling the mold box, a movable slicker cooperable therewith, guide means for said slicker, and intermittently operating drive mechanism for moving said slicker along the guide means.

35. A machine of the class described comprising a vertically movable mould-box, means for filling the mold box, a slicker cooperable therewith, a substantially horizontal guide track for said slicker, and means for causing said slicker to move along said guide track from one side of the mould-box to the other.

36. A machine for making plastic shapes comprising a vertically movable mould-box, means for filling said box with plastic material and for discharging the moulded shape therefrom, a slicker device for removing surplus material from the top of the mould, and means for reciprocating said slicker transversely across the mould-box in alternation with successive filling operations.

37. A machine of the class described comprising a vertically movable mould-box, means for delivering successive charges of material thereto, a horizontal guide track extending transversely across the mould-box, a slicker device supported by said guide track, and means for causing said slicker to travel along said track first in one direction and then in the opposite direction, the individual reciprocations of the slicker alternating with successive fillings of the mould-box.

38. A machine of the class described comprising a movable slicker, a guide therefor, drive means for moving said slicker along said guide, and automatically operative means for stopping said drive means as the slicker approaches one end of said guide.

39. A machine for making plastic shapes, comprising a slicker, a guide rail therefore, drive means operative to move said slicker along the guide rail, and means actuated by the slicker to arrest its movement as it approaches either end of the guide rail.

40. A machine of the class described comprising a slicker, a guide rail therefor, a constantly rotating element, means for transmitting motion from said element to the slicker whereby to move it along the rail, and automatically actuated clutch means for determining such movement of the slicker.

41. A machine for making plastic shapes comprising a movable slicker, a guide therefor, a rotatable shaft, an actuating chain, means connecting the chain with the slicker, clutch means for transmitting movement from the shaft to the chain, and automatic means for operating said clutch means.

42. A machine of the class described comprising a mould-box, a guide extending transversely across the same, a slicker support movable along said guide, a chain having a run extending substantially parallel to the guide, means connecting the slicker support to said run of the chain, a rotatable shaft, means for transmitting movement from the shaft to the chain in opposite directions, alternately, and means actuable by the slicker in its movement along the guide as it approaches either end thereof whereby to terminate its movement.

43. A machine of the class described comprising a movable slicker, a guide means therefor, clutch means for transmitting movement to the slicker, a lever for controlling said clutch means, and a cam element movable with the slicker for determining movement of said lever.

44. A machine for making plastic shapes comprising a movable slicker, cooperable clutch elements for transmitting movement to the slicker, a lever for controlling said clutch elements, spring means normally tending to move said lever whereby to disengage said clutch elements, a latch for holding the lever against the action of the spring, and cam means movable with the slicker for disengaging said latch.

45. A machine of the class described comprising a vertically movable element, a movable slicker, a guide for said slicker, cooperable clutch elements for transmitting movement to said slicker, a lever device for determining engagement of said elements, a latch engageable with said lever, means connecting said vertically movable element with said latch so constructed and arranged that upon downward movement of said element the latch member actuates the lever whereby to engage the clutch elements, and means movable with the slicker to render such latch inoperative.

46. A machine of the class described comprising a vertically movable pallet conveyor support, a horizontally slidable slicker, cooperable clutch members for transmitting movement to the slicker, a lever for controlling said clutch elements, a spring normally tending to disengage said elements, a latch engageable with said lever for moving said clutch members into engagement, means movable with the slicker for disengaging said latch from the lever, and connections between the conveyor support and said latch such that upon depression of the support the latch is actuated for bringing the clutch members into engagement.

47. A machine of the class described comprising a pallet conveyor chain, a vertically movable support therefor, a horizontally reciprocable slicker, a pair of clutches each having cooperable elements for transmitting movement to the slicker, said clutches being constructed and arranged respectively to transmit movement in opposite directions to the slicker, levers for determining engagement of the cooperable elements of the respective clutches, springs urging said levers to disengaging position, a pair of rods extending in opposite directions, latches carried by said rods and engageable with the respective levers whereby to move them in opposition to the springs, bell cranks supporting the latch carrying ends of the respective rods, cam means movable with the slicker and cooperable with the respective bell cranks whereby to determine engagement of the latch elements with their respective levers, and connections between said conveyor support and said rods such that upon depression of the support each latch is so actuated as to swing its lever into clutch engaging position, providing such latch is then engaged with its lever.

48. In combination in a machine of the class described having a charge delivering mechanism including a releasing element, a vertically movable mold, means for slicking off surplus material from the top of the mold, and means operative upon movement of the mould to charge receiving position to actuate the charge releasing element and to initiate movement of the slicker 49. In combination, in a machine for molding plastic shapes having a charge delivering hopper provided with a releasing element, a pallet conveyor, a vertically movable support therefor, a mould-box movable into contact with a pallet resting upon said conveyor, a slicker for removing surplus material from the top of the mould, and means operable upon depression of the pallet conveyor support, to actuate the charge releasing element and to initiate movement of the slicker.

50. In combination in a machine for molding plastic shapes having charge delivering means including a charge releasing element, a vertically movable mold-box, and means actuable by movement of the mould-box for determining the actuation of the charge releasing element.

51. A machine of the class described comprising a vertically movable mold-box, means for delivering a charge of material thereto, a slicker for removing surplus material from the top of the mold-box, means for moving the slicker, and means actuable by movement of the mould-box for determining movement of the slicker.

Signed by me at Boston, Massachusetts, this twenty-eighth day of April, 1922.

CHARLES L. NORTON.

Certificate of Correction.

It is hereby certified that in Letters Patent No. 1,526,364, granted February 17, 1925, upon the application of Charles L. Norton, of Boston, Massachusetts, for an improvement in "Apparatus Useful in Making Plastic Shapes," errors appear in the printed specification requiring correction as follows: Page 8, lines 19 and 20, claim 6, for the misspelled word " undirectionally " read *unidirectionally;* page 10, line 90, claim 43, strike out the article " a," second occurrence; and that the said Letters Patent should be read with these corrections therein that the same may conform to the record of the case in the Patent Office.

Signed and sealed this 21st day of July, A. D. 1925.

[SEAL.]

KARL FENNING,
*Acting Commissioner of Patents.*